Sept. 30, 1969                    W. J. BROWN                        3,470,439
                    RECTIFIER CONTROL CIRCUIT FOR MOTOR CONTROL
Filed Sept. 2, 1966                                            2 Sheets-Sheet 1

INVENTOR.
Walter J. Brown.

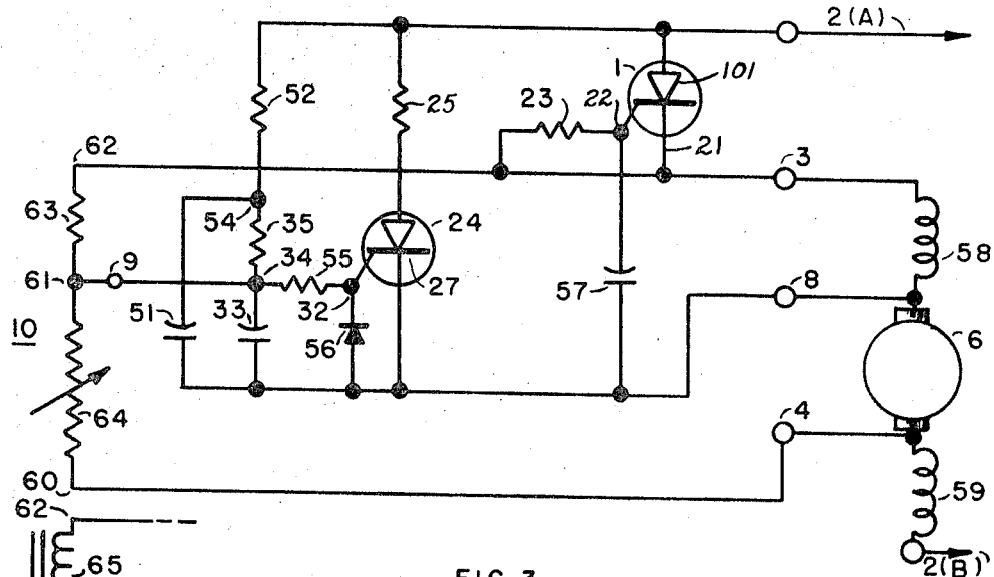
FIG 3
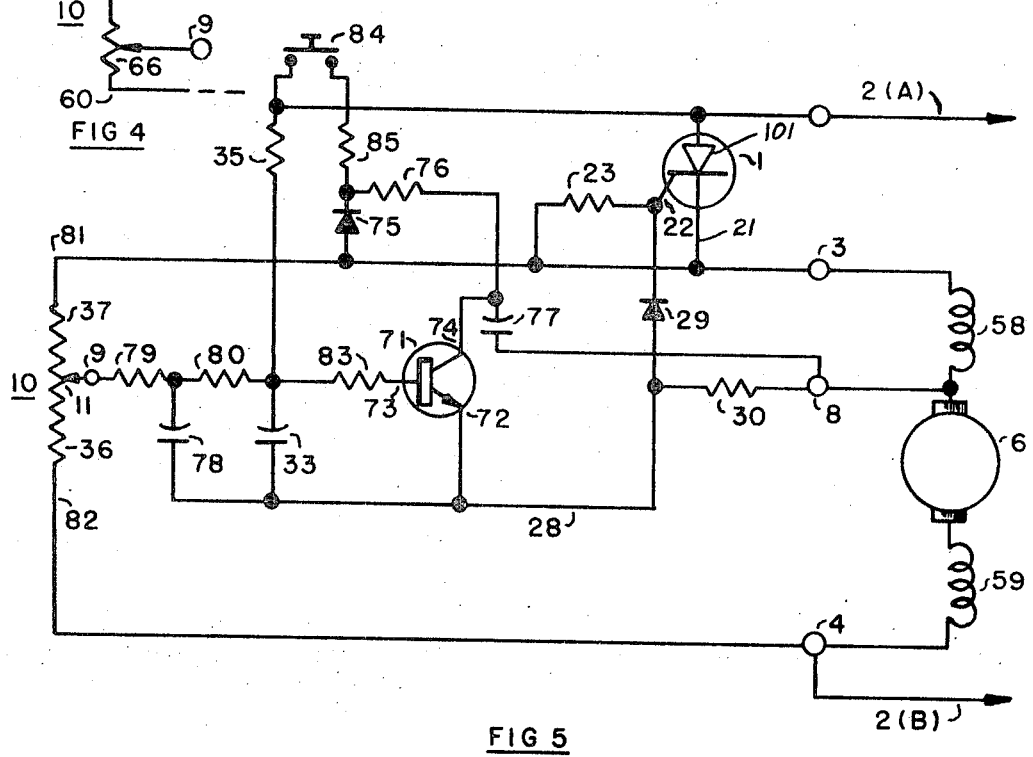
FIG 4
FIG 5
INVENTOR.
Walter J. Brown

United States Patent Office 3,470,439
Patented Sept. 30, 1969

3,470,439
RECTIFIER CONTROL CIRCUIT FOR
MOTOR CONTROL
Walter J. Brown, 71 Gurley Road,
Stamford, Conn. 06902
Filed Sept. 2, 1966, Ser. No. 577,078
Int. Cl. H02k 27/20; H02p 5/12
U.S. Cl. 318—331                             16 Claims

ABSTRACT OF THE DISCLOSURE

A power control system for a series wound electric motor receives rectified alternating current supply and includes a gated power rectifier controlled by a controllable semiconductor pilot device, such as a silicon controlled rectifier or a transistor. The pilot device has control means connected across a capacitor in an error signal circuit and is substantially isolated from the gated power rectifier during conduction periods in each alternating current cycle.

---

This invention relates to the control of gated or controlled rectifiers, such, for instance, as thyristors, otherwise known as silicon controlled rectifiers, or in abbreviated form as SCR's. Such a rectifier is provided with at least two power terminals and a gate or control terminal which inhibits conduction of current between said power terminals during each cycle of its alternating current supply until such time as a suitable firing current or voltage is impressed upon the gate during the conductive half cycle of alternating voltage applied to the power terminals; the rectifier thereafter conducts power current during the remainder of said conductive half cycle. By varying the timing of application of said gate firing current or voltage with respect to the alternating voltage applied to the power terminals, the conduction period during each conductive half cycle may be varied over a wide range, thus varying the average power current flowing through the rectifier.

In particular, the invention relates to simplified circuits for applying timed firing currents or voltages to the rectifier gate and one of its power terminals such as its cathode, in accordance with a source of actuating voltage or current which source is at a different potential from either the cathode or gate of the controlled rectifier, without the use of a transformer.

According to this invention, in a system of the kind referred to, the rectifier gate is cyclically fired by coupling from a pilot semiconductor device, such as a small SCR or a transistor used in the switching mode, said pilot device being fired or turned on by an asymmetric actuating signal which is applied across capacitive means of such magnitude as to store a substantial part of the actuating signal from each cycle to the next cycle and substantially to reduce any ripple in said actuating signal voltage, said capacitive means also being coupled to the alternating current supply in such a manner as to superimpose on the actuating signal an alternating voltage which lags the supply voltage by approximately 90 degrees of phase angle.

In particular, this invention may be applied to the firing of a gated rectifier which forms the controllable electric power converter in my United States Patents Nos. 2,733,395, 2,777,106. 2,799,818 and 2,799,819, for the speed control of series wound or universal electric motors.

In the drawings:

FIGURE 1 illustrates one example of this invention as applied to the control of series wound electric motors.

FIGURES 2(A), 2(B) and 2(C) depict voltage waveforms relating to the circuit of FIGURE 1.

FIGURE 3 illustrates an alternative arrangement according to the invention.

FIGURE 4 shows an alternative arrangement of a part of FIGURE 3.

FIGURE 5 illustrates another alternative arrangement of the inveniton.

Many of the components have similar functions in more than one drawing and are similarly numbered for ease of reference.

Figure 1:
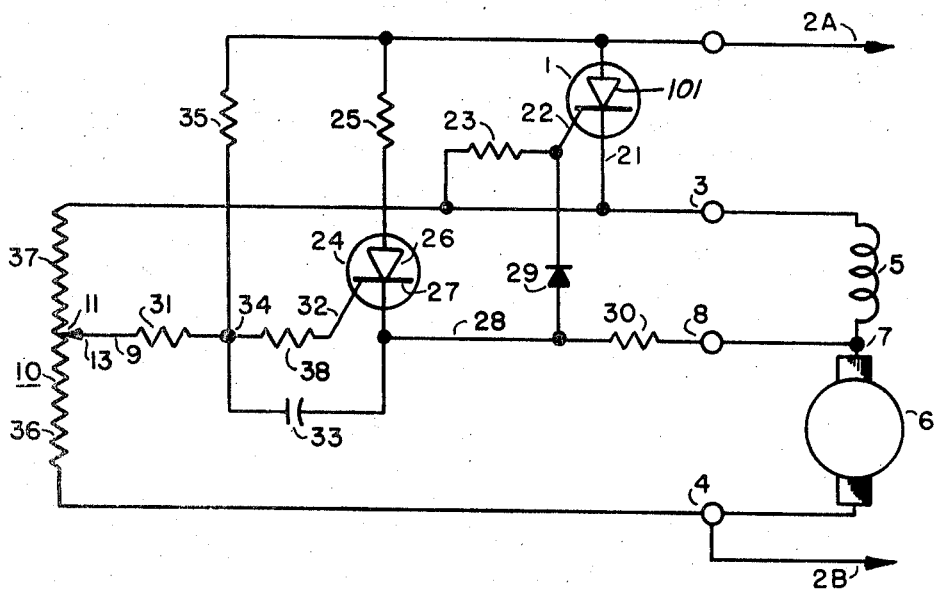

FIGURE 1 illustrates my invention as applied to a system for adjusting and/or regulating the speed of a series wound or universal motor, as described in United States Patent No. 2,733,395 with reference to FIGURE 1 of said patent. The following reference numerals are equivalent to those in FIGURE 1 of Patent No. 2,733,395.

A controllable electric power converter 1, illustrated as a silicon controlled rectifier, derives its power from alternating current supply lines 2A and 2B, and delivers power to terminals 3 and 4 of a series wound or universal motor having a field winding 5, an armature 6, and a common point or intermediate point 7, which is connected to a control point 8. A potential divider 10 is connected across said motor terminals and has a tapping 11 connected to a control point 9.

In such a system it is necessary to vary the output of the SCR 1 in accordance with a small asymmetric error signal between control points 9 and 8. Said error signal comprises the potential difference between a reference potential at potentiometer tapping 11 and a feedback potential at the intermediate or common point 7 on the motor. The error signal is necessarily asymmetric, since it normally includes a direct voltage component and an alternating voltage component (see FIGURES 2(A) and 2(C)). The direct voltage component may have a positive or zero or a negative value, according to the operating conditions. Such an error signal is also known in the art as an actuating signal (see "Automatic Feedback Control," Ahrendt and Taplin, McGraw-Hill, 1951, Glossary page 401).

It will be noted that the error signal circuit between 9 and 8 is at an entirely different and variable voltage level with respect to the SCR cathode 21 or gate 22, and this problem is overcome by the circuit of FIGURE 1 in the following way. When conduction of the gated rectifier SCR1 is not desired, its gate 22 is maintained at the potential of its cathode 21 by means of resistor 23. The SCR1 is fired at the desired instant by firing a pilot semiconductor device such as an SCR24, or a switching transistor, or a field effect transistor, thus suddenly initiating current from the alternating current line 2A through resistor 25, anode 26 and cathode 27 of SCR24, conductor 28 and diode 29 to the gate 22 of the gated rectifier 1 thus initiating conduction of current between the power terminals 101 and 21 of the gated rectifier 1 to the motor.

Resistor 30 permits an adequate proportion of the current from pilot SCR24 to flow to the rectifier gate 22, while still providing a continuous path for the flow of error signal current between points 9 and 8 or 11 and 7.

This error signal current passes from the potentiometer tap 11 and control point 9 through optional resistor 31 and resistor 38, thence through gate 32 and cathode 27 of SCR24 to conductor 28 and resistor 30 to control point 8 and to the common point 7 of the motor field 5 and armature 6; by suitably choosing the resistance value of potential divider 10, the resistor 31 may be omitted.

Ripple in the error signal is substantially absorbed by the capacitor 33 which, however, has two additional functions as follows:

Secondly, the capacitor 33 is of such magnitude as to store a substantial part of the potential difference across its terminals from the termination of one conducting period of SCR1 until the commencement of the conducting period during the next cycle.

Thirdly, the upper terminal 34 of this capacitor is connected through a high resistance 35 to the alternating current line 2A. This creates an alternating voltage across capacitor 33 during the non-conducting periods which is retarded in relation to the voltage of the alternating current source by an angle approaching 90 degrees, hereinafter referred to as a quadrature voltage. Referring now to FIGURE 2, the sine wave 40 represents the A.C. line voltage applied to the anode of the pilot SCR24. The horizontal lines 41 represent the voltage required to fire the gate 22 of this SCR. The partially dotted sinusoidal curve 42 represents the quadrature voltage across capacitor 33 which is applied between gate and cathode of the pilot SCR24, through the optional current-limiting resistor 38.

Figures 2A, 2B, 2C:
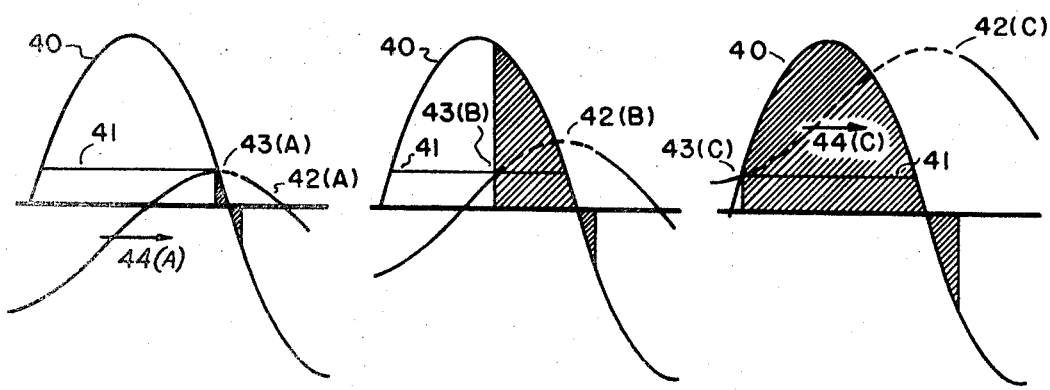

When there is no asymmetric actuating signal across capacitor 33, the only voltage applied between gate and cathode of the pilot SCR24 is the A.C. quadrature voltage 42(b) in FIGURE 2(b), and this intersects the line 41 and causes this SCR to fire at the point 43(b) and to initiate conduction of current through SCR1 during the period indicated by the shaded area. As soon as SCR1 has fired, the anode voltage of SCR24 and its current are reduced substantially to zero so that SCR24 may be a very small inexpensive device. When a negative asymmetric actuating signal, having the potential shown by the arrow 44(a), is applied to capacitor terminal 34 and thence to gate 32, the point of intersection of the quadrature voltage 43(a) with the firing line 41 is delayed, and firing occurs so late in the cycle as to produce little or no output, as shown by the small shaded area in FIGURE 2(a).

Conversely, when a positive asymmetric actuating signal is applied to capacitor terminal 34, so that the D.C. level is raised to that of the arrow 44(c) in FIGURE 2(c), the firing point of intersection of the quadrature voltage 42(c) with the firing voltage line 41 is advanced until ultimately the rectifier SCR1 conducts for almost a complete half cycle, as shown in FIGURE 2(c).

In this way, the output of SCR1 is continuously variable in accordance with the average value of the error signal between points 9 and 8. By applying only a small quadrature voltage 42, of the order of plus or minus 1 volt across capacitor 33, the actuating signal can be made negligible compared with the line voltage, and likewise the total error signal between control points 9 and 8 can be made small by suitable choice of resistors 10, 31 and 30.

Accordingly, the circuit operates as a closed loop feedback system, always maintaining a small or negligible asymmetric error signal voltage between points 9 and 8. Resulting from this, the ratio of motor armature voltage to motor field viltage can be made substantially equal to the ratio of the lower portion 36 to the upper portion 37 of potential divider $P_1$.

This tends to maintain a constant speed of the series wound or universal motor 5, 6, in the manner described in Patent No. 2,733,395.

In FIGURE 2, those sections of the quadrature voltage 42 which are concurrent with the conducting periods of SCR1 are shown in dotted lines, because the sinusoidal shape of this voltage may be severely distorted during the conducting periods.

In FIGURE 2 the sine wave 40 represents the alternating current lines voltage to a reduced scale.

FIGURE 3 shows an alternative arrangement to that of FIGURE 1. In FIGURE 3, the capacitive means provides an increased lag in the alternating voltage which is applied to terminal 34 of capacitor 33. This increased lag is provided by capacitor 51 in conjunction with resistor 52 so that a lagging voltage is supplied to the upper end 54 of resistor 35.

FIGURE 3 also shows a current limiting resistor 55 in series with the gate 32 of device 24, which permits the use of higher impedances in the components 35, 33, and in the potential divider 10. Also, a diode 56 is connected from gate 32 to cathode 27 to prevent negative overdriving of the semiconductor device 24 and to reduce distortion in the quadrature voltage waveform across capacitor 33 during conduction of SCR1.

In FIGURE 3 also, the diode 29 of FIGURE 1 is replaced by a capacitor 57 which in conjunction with the gate-to-cathode resistance of SCR1 and the resistor 23 acts as a high pass filter which permits firing of SCR1 by the fast rising pulse applied upon conduction of the device 24, while inhibiting such firing by slower rising voltages due to commutator ripple from the motor. This also permits the omission of resistor 30 in FIGURE 1 since the inductance of the motor field does not by-pass a sufficient part of the fast rising firing pulse as would prevent it from firing SCR1.

In FIGURE 3 only one of the field windings 58 of the motor is included in the feed-back loop 3, 8, 4, 60, 61 and 62, so that the ripple in this loop is reduced; the remaining field winding or windings 59 is or are connected outside the loop so that its or their ripple is eliminated from the loop.

Furthermore, in FIGURE 3, the potential divider 10 comprises a fixed impedance shown as a resistor 63 and a variable impedance shown as a resistor 64 which may be of the slider type or may be a pressure-sensitive resistor such as a carbon pile.

FIGURE 4 shows an alternative arrangement of the potential divider 10 in FIGURES 1 or 3. The upper portion of this potential divider comprises a choke coil 65 having inductance and inherent or added resistance so chosen as approximately to establish an alternating current bridge balance between the motor circuit 3, 58, 8, 6 and 4, and the potential divider circuit 62, 65, 9, 66 and 60. By choosing suitable values for the choke 65 and the potentiometer 66, the ripple current in the error-signal circuit from point 9 to point 8 in FIGURES 1 and 3 is greatly reduced, thus allowing for higher impedance elements and reduced power dissipation in the potential divider and in the error-signal circuit.

FIGURE 5 shows a further alternative circuit in which the pilot semiconductor device comprises a transistor 71 having an emitter 72, base 73 and collector 74. To avoid the cost of a high voltage transistor, the collector is supplied with a relatively low direct current voltage obtained by rectifying the peak voltage across field winding 58 by means of diode 75, filter resistor 76 and filter capacitor 77; this peak voltage reaches a more than adequate value immediately upon the firing of SCR 1, due to the inductance of the field winding 58 and is stored until the next cycle.

A quadrature voltage is applied to base 73 by means of capacitor 33 and high resistance 35 through optional resistor 83. To minimize distortion of this quadrature voltage, the error signal between points 9 and 8 is filtered by capacitor 78 and resistor 80 and optional resistor 79. To reduce the unwanted ripple in the error signal still further, one part 58 of the field windings is connected in the upper section of the bridge circuit 8, 58, 3, 81, 37 and 11, and the remainder 59 of the field windings is or are connected in the lower section of the bridge circuit 8, 6, 59, 4, 82, 36 and 11.

Only two field windings 58 and 59 are shown in FIGURE 5, since most universal motors have only two poles, each carrying a field winding. If, however, the motor is multipolar and has $2n$ field windings, then $n$ windings take the place of the winding 58 and the remaining $n$ windings take the place of the winding 59 in FIGURE 5.

The arrangement of FIGURE 5 operates in a similar manner to the circuits of FIGURES 1 and 3 with voltage waveforms similar to those of FIGURE 2. Instead of firing the pilot SCR 24 of FIGURES 1 and 3, the transistor 71 is suddenly turned on when the voltage 42 in FIGURE 2 applied to its base 73 exceeds the voltage 41 at which collector current starts to flow; the transistor is operated in a switching or saturated mode so that the collector current rises very rapidly after the base voltage 41 is exceeded, thus discharging capacitor 77 through the collector 74, emitter 72, conductor 28 and diode 29 to the gate 22 of SCR 1.

Since no collector voltage can be applied to the transistor 71 until the field winding 58 has voltage applied to it by SCR 1, the system of FIGURE 5 is not self-starting. Accordingly, starting means must be provided, such as a momentary contact pushbutton 84 which applies initial voltage to the transistor collector 74 through current-limiting resistor 85.

An important feature of applicant's invention is that the connection from the power terminal 27 of the pilot semiconductor device 24 to the gate 22 of the gated rectifier 1 is made through a two-terminal circuit element 29 which is adapted to conduct firing current pulses from the power terminal 27 of the pilot device into the gate 22; so as to initiate conduction between the power terminals 21 and 101 of the gated rectifier during each cycle of the alternating current source, while inhibiting the flow of current in said gate terminal after such conduction is established.

This is necessary, since a high voltage may exist between cathodes 21 and 27 and which may persist during the conductive half cycles of the alternating current source; if this voltage were applied to the rectifier gate 22 it could develop so much internal heating as to destroy the gate 22.

Accordingly, the arrangement described above inhibits the continued application of gate voltage during the conductive half cycles and provides substantial isolation from continued voltage application by means of a diode 29 (FIGURES 1 and 5), or a capacitor 57 (FIGURE 3), each being considered a two-terminal circuit element for the purpose of this specification.

This invention has been described and illustrated in its application to the control of a rectifier supplying power to a series wound or universal motor in a bridge circuit in which the controlled rectifier terminals are at a different and variable voltage level with respect to the error signal or actuating signal. While particularly suitable for the control of series wound motors, the invention may be applied to other control systems in which the rectifier terminal voltage levels differ from the voltage levels in the actuating signal circuit.

What is claimed is:

1. A power control system for connection to an alternating current source and for supplying controlled power to an electric motor circuit including serially connected armature and field windings and having an intermediate terminal for providing a feedback signal, comprising:
   a gated rectifier having power terminals and at least one gating terminal, said power terminals being adapted for series connection with said source and said motor circuit;
   a potential divider connected effectively in parallel with at least a portion of said serially connected motor circuit and having a tap thereon for providing a reference signal;
   an error signal circuit serially connected between said tap and said intermediate terminal of said motor circuit;
   said error signal circuit including capacitive means of sufficient magnitude for storing a substantial part of the potential difference between the reference signal and the feedback signal from one cycle to the next cycle of the alternating current source and for smoothing the ripple in said error signal circuit;
   an impedance effectively coupled between the alternating current source and one terminal of said capacitive means across which an alternating voltage is thereby developed that is retarded in phase relation to the voltage of the alternating current source;
   a controllable semiconductor pilot device having a control terminal and a first and second power terminal, the control terminal and the first power terminal being effectively connected in parallel with said capacitive means;
   means for applying voltage derived from said alternating current source to the second power terminal of said semiconductor pilot device;
   and a two-terminal circuit element connecting the first power terminal of said pilot device to the gating terminal of said gated rectifier, and being adapted to conduct firing current pulses from said first power terminal of said pilot device into said gating terminal to initiate conduction between the power terminals of said gated rectifier during each cycle of said alternating current source while inhibiting the flow of current in said gate terminal after such conduction is established.

2. An electric drive, having speed-regulating characteristics for operation from an alternating current supply, comprising:
   an electric motor circuit including serially connected armature and field windings;
   a controlled rectifier having power terminals and at least one gating terminal for determining the conductive period during each cycle of the alternating current supply, arranged for connection of its power terminals to said supply in series with said motor circuit;
   a potential divider connected across at least part of said motor circuit and having a tap thereon;
   an error signal circuit connected between said tap and a point on said motor circuit for sensing the potential difference between said tap and a speed-dependent potential at said point;
   a controllable semiconductor pilot device having power terminals and control means, said control means being connected substantially in series in said error signal circuit;
   capacitive means connected substantially in parallel with the control means of said pilot semiconductor device, whereby said capacitive means acts to smoothen ripple existing across said control means and further provides a memory of the potential difference in the error signal circuit from each conducting period to the subsequent conducting period of said gated rectifier;
   a resistive connection from one terminal of said capacitive means to a point on said alternating current supply whereby an alternating voltage is developed across said capacitive means which lags the voltage of the alternating voltage supply by the order of 90° during the non-conductive periods of said gated rectifier;
   and a circuit from the alternating current source through the power terminals of said pilot semiconductor device to the gating terminal of said controlled rectifier; the connection to the gating terminal being made through a two-terminal circuit which is adapted to conduct firing pulses to said gating terminal during non-conducting periods of said controlled rectifier, while providing substantial isolation of said gating terminal from the remainder of said circuit during conducting periods of said controlled rectifier.

3. The combination of claim 1 in which the capacitive means comprises a single capacitor, one terminal of which is connected through a high resistance element to a terminal of the alternating current source.

4. The combination of claim 1 in which the capacitive means comprises a first and a second capacitor having common first terminals which are connected to one of said power terminals of said pilot semiconductor device; the second terminal of the first capacitor being connected through resistive means to the alternating current source and to said control terminal of said pilot semiconductor device; the second terminal of the second capacitor being connected to an intermediate point on said resistive means.

5. The combination of claim 1 in which the capacitive means comprises first and second capacitors having common first terminals connected to one of said power terminals of said pilot semiconductor device; the second terminal of the first capacitor being connected through resistive means to the alternating current source and to said control terminal of said pilot semiconductor device; the second terminal of the second capacitor being connected through a resistor to the second terminal of said first capacitor and also to the tap on the potential divider.

6. The combination of claim 5, in which the second terminal of said first capacitor is connected through a resistor to said control terminal.

7. The combination of claim 5 in which the second terminal of said second capacitor is connected through a resistor to the tap on the potential divider.

8. The combination of claim 1 in which a power terminal of said pilot semiconductor device is serially connected through a diode to the gating terminal of said rectifier.

9. The combination of claim 1 in which a power terminal of said pilot semiconductor device is connected through a capacitor to the gating terminal of said rectifier.

10. The combination of claim 1 in which said pilot semiconductor device comprises a gated rectifier having a power terminal coupled to the alternating current source.

11. The combination of claim 1 in which the pilot semiconductor device comprises a transistor operated in the switching mode.

12. The combination of claim 2 in which the power terminals of the gated rectifier are connected respectively to a first terminal of said alternating current supply and to the field windings of the motor;
 the other end of said field windings being connected to a first armature terminal of the motor and to the error-signal circuit;
 the second armature terminal being connected to a second terminal of said alternating current supply.

13. The combination of claim 2 in which the power terminals of the gated rectifier are connected respectively to a first terminal of said alternating current supply and to a first field winding of the motor;
 the other end of said first field winding being connected to a first armature terminal and to the error-signal circuit;
 the second armature terminal being connected to a second field winding and to one end of said potential divider;
 the other end of said second field winding being connected to a second terminal of said alternating current supply.

14. The combination of claim 2 in which the power terminals of the gated rectifier are connected respectively to a first terminal of said alternating current supply and to a first field winding of the motor;
 the other end of said first field winding being connected to one end of the series combination of the armature and a second field winding and also to the error-signal circuit;
 the other end of said series combination being connected to a second terminal of said alternating current supply and also to one end of the potential divider.

15. The combination of claim 2 in which the potential divider comprises the series combination of an inductive element and a potentiometer, dimensioned to reduce unwanted ripple current in the error-signal circuit.

16. In an electric motor circuit for operation from an alternating current source in which the motor has serially connected armature and field windings, the combination of:
 the series combination of a first semiconductor device and the field and armature windings of said motor;
 means for gating said first semiconductor device whereby to vary the cyclical conductive period of electric current supplied to said windings;
 a control circuit which includes a voltage divider coupled at least to a part of said windings and providing a signal responsive to the conductive period of said first semiconductor;
 a transistor deriving a unidirectional collector voltage through rectifying means from the voltage developed across at least a part of said motor field windings;
 said transistor being coupled to receive said signal responsive to said conductive period and also a feedback signal from said windings and providing a switching signal to said first semiconductor for controlling the conductive period thereof; and
 capacitive means of sufficient magnitude connected in said control circuit for storing the potential difference between said two signals coupled to said transistor, for smoothing voltage ripples existing across said transistor, and for providing in combination with an alternating current connected to said capacitive means a voltage which lags the phase angle of said alternating current source by an amount sufficient to regulate the motor speed over a desired range.

References Cited

UNITED STATES PATENTS

| | | | |
|---|---|---|---|
| 2,799,819 | 7/1957 | Brown | 318—332 XR |
| 3,095,534 | 6/1963 | Cockrell | 318—331 X |
| 3,178,628 | 4/1965 | Van Patten | 318—331 |
| 3,271,648 | 9/1966 | Weed | 318—331 |
| 3,278,821 | 10/1966 | Gutzwiller | 318—331 |
| 3,377,536 | 4/1968 | Bacquart | 318—345 XR |

OTHER REFERENCES

Grafham, D. R., "Using Low Current Silicon Controlled Rectifiers and Silicon Controlled Switches," pp. 12 and 13, General Electric Application Note, Rectifier Components Dept. 200.19, 3/62.

ORIS L. RADER, Primary Examiner

ROBERT J. HICKEY, Assistant Examiner

U.S. Cl. X.R.
318—345